United States Patent
Kurani et al.

(10) Patent No.: US 12,475,457 B1
(45) Date of Patent: Nov. 18, 2025

(54) ALLOCATION OF NON-FUNGIBLE TOKEN (NFT) BY CONTAINERIZED DATA STRUCTURES

(71) Applicant: Wells Fargo Bank, N.A., San Francisco, CA (US)

(72) Inventors: Ashish B. Kurani, Hillsborough, CA (US); Dennis E. Montenegro, Concord, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 289 days.

(21) Appl. No.: 18/081,379

(22) Filed: Dec. 14, 2022

(51) Int. Cl.
*G06Q 20/38* (2012.01)
*G06Q 20/36* (2012.01)

(52) U.S. Cl.
CPC ........... *G06Q 20/389* (2013.01); *G06Q 20/36* (2013.01); *G06Q 20/3829* (2013.01)

(58) Field of Classification Search
CPC ... G06Q 20/389; G06Q 20/36; G06Q 20/3829
USPC ......................................................... 705/71
See application file for complete search history.

(56) References Cited

U.S. PATENT DOCUMENTS

| | | |
|---|---|---|
| 6,311,171 B1 | 10/2001 | Dent |
| 10,946,283 B1 | 3/2021 | Meilich et al. |
| 11,139,955 B1 | 10/2021 | So et al. |
| 11,200,569 B1 | 12/2021 | James et al. |
| 11,334,876 B2 | 5/2022 | Yantis et al. |
| 11,972,415 B1 | 4/2024 | Panes |
| 12,033,120 B1 | 7/2024 | Stroke et al. |
| 2010/0329455 A1 | 12/2010 | Nemiroff |
| 2015/0046337 A1 | 2/2015 | Hu et al. |
| 2015/0287026 A1 | 10/2015 | Yang et al. |
| 2017/0024818 A1 | 1/2017 | Wager et al. |
| 2017/0180367 A1 | 6/2017 | Warren |

(Continued)

FOREIGN PATENT DOCUMENTS

| | | | |
|---|---|---|---|
| CN | 114358946 A | * | 4/2022 |
| EP | 3 654 578 A1 | | 5/2020 |

(Continued)

OTHER PUBLICATIONS

Sangam Bhujel, A Survey: Security, Transparency, and Scalability Issues of NFT's and Its Marketplaces, Nov. 2022, https://www.ncbi.nlm.nih.gov/pmc/articles/PMC9696178/pdf/sensors-22-08833.pdf (Year: 2022).

(Continued)

*Primary Examiner* — Courtney P Jones
(74) *Attorney, Agent, or Firm* — Foley & Lardner LLP

(57) ABSTRACT

Aspects of this technical solution can include registering a first non-fungible token (NFT) account of a customer to a first public and private key pair, registering a second NFT account of a financial institution to a second public and private key pair, receiving a request to transfer to the first NFT account an NFT having a quantitative value, generating a second quantitative value of the NFT based on the quantitative value of the NFT and a quantitative value of fiat currency, transferring the NFT to a smart contract, linking the first public and private key pair to the smart contract and a fractional value of the NFT, and linking the second public and private key pair to the smart contract and the second quantitative value of the NFT.

20 Claims, 8 Drawing Sheets

(56) References Cited

U.S. PATENT DOCUMENTS

| | | |
|---|---|---|
| 2018/0144122 A1 | 5/2018 | Dymond |
| 2018/0374087 A1 | 12/2018 | Lu et al. |
| 2019/0164221 A1 | 5/2019 | Hill et al. |
| 2020/0234267 A1 | 7/2020 | Sanders et al. |
| 2020/0302410 A1 | 9/2020 | Macgregor et al. |
| 2020/0356989 A1 | 11/2020 | Shamai et al. |
| 2021/0065293 A1 | 3/2021 | Sigler et al. |
| 2021/0119807 A1 | 4/2021 | Chen et al. |
| 2021/0133700 A1 | 5/2021 | Williams et al. |
| 2021/0256070 A1 | 8/2021 | Tran et al. |
| 2021/0319428 A1 | 10/2021 | Yantis et al. |
| 2021/0390531 A1 | 12/2021 | Voorhees et al. |
| 2022/0027902 A1 | 1/2022 | Vandenberg et al. |
| 2022/0075845 A1 | 3/2022 | Bowen et al. |
| 2022/0092599 A1 | 3/2022 | Sofaer |
| 2022/0101316 A1 | 3/2022 | Cramer |
| 2022/0108232 A1 | 4/2022 | Hardgrave et al. |
| 2022/0114600 A1 | 4/2022 | Blackburn et al. |
| 2022/0122062 A1 | 4/2022 | Mayblum et al. |
| 2022/0138760 A1 | 5/2022 | Dipasquale |
| 2022/0138849 A1 | 5/2022 | Henson et al. |
| 2022/0164815 A1 | 5/2022 | Petersen et al. |
| 2022/0172287 A1 | 6/2022 | Jung |
| 2022/0173893 A1 | 6/2022 | Basu et al. |
| 2022/0230175 A1 | 7/2022 | Haruna et al. |
| 2022/0253834 A1 | 8/2022 | Vijayan |
| 2023/0017499 A1* | 1/2023 | Agrawal ............... H04L 9/3236 |
| 2023/0073545 A1* | 3/2023 | Kurian ................. G06Q 20/401 |
| 2023/0106751 A1 | 4/2023 | Wainstein et al. |
| 2023/0108610 A1 | 4/2023 | Tang et al. |
| 2023/0121749 A1 | 4/2023 | Lee |
| 2023/0124040 A1 | 4/2023 | Quigley et al. |
| 2023/0130594 A1* | 4/2023 | Quigley ................. G06Q 20/40 705/65 |
| 2023/0137867 A1* | 5/2023 | Walters ................. H04L 9/3297 705/75 |
| 2023/0139878 A1 | 5/2023 | Clark et al. |
| 2023/0162188 A1 | 5/2023 | Silver |
| 2023/0163975 A1 | 5/2023 | Kelly et al. |
| 2023/0281585 A1 | 9/2023 | Kechik |
| 2023/0289820 A1* | 9/2023 | Boardman ........... G06Q 30/018 |
| 2023/0298001 A1* | 9/2023 | Jethmalani ............. G06Q 20/36 705/65 |
| 2023/0315819 A1 | 10/2023 | Guy et al. |
| 2023/0318851 A1 | 10/2023 | Kojima et al. |
| 2024/0005320 A1 | 1/2024 | Pardo |
| 2024/0007309 A1 | 1/2024 | Dowling et al. |
| 2024/0013195 A1 | 1/2024 | Osborn et al. |
| 2024/0020682 A1 | 1/2024 | Castagna et al. |
| 2024/0095700 A1 | 3/2024 | Mcdonnell |
| 2024/0144331 A1* | 5/2024 | Perelmuter ............ G06Q 40/03 |
| 2024/0152905 A1 | 5/2024 | Franco et al. |
| 2024/0330376 A1* | 10/2024 | Solh ...................... G06F 16/951 |

FOREIGN PATENT DOCUMENTS

| | | |
|---|---|---|
| EP | 4 012 970 A1 | 6/2022 |
| WO | WO-2023/069689 A2 | 4/2023 |

OTHER PUBLICATIONS

Elimobile Launches the First Tokenized Telco, Partners with Elite Token to Create a Celebrity Powered Ecosystem, o https://www.globenewswire.com/news-release/2022/05/16/2443461/0/en/Elimobile-Launches-the-First-Tokenized-Telco-Partners-with-Elite-Token-to-Create-a-Celebrity-Powered-Ecosystem.html, pp. 1-4.

Fazli et al., "Under the Skin of Foundation NFT Auctions," o https://arxiv.org/abs/2109.12321, pp. 1-4.

Frankenfield, "Is SALT Blockchain-Based Lending the Future of All Personal Loans?," o https://www.investopedia.com/tech/salt-secured-automated-lending-technology-blockchain/, pp. 1-10.

Hartmann, Torsten, "What Are NFT Loans? Where Can You Get an NFT-backed Loan," (May 9, 2022), https://captainaltcoin.com/nft-loans/, pp. 1-10.

Musan, "NFT.finance Leveraging Non-Fungible Tokens," o https://www.imperial.ac.uk/media/imperial-college/faculty-of-engineering/computing/public/1920-ug-projects/distinguished-projects/NFT.-finance-Leveraging-Non-Fungible-Tokens.pdf, pp. 1-85.

Patairya, "How Do You Assess the Value of an NFT," o https://cointelegraph.com/news/how-do-you-assess-the-value-of-an-nft, pp. 1-12.

Steinwold, "NFT Valuation, Lending & Borrowing: Putting Non-Fungible Assets to Work," o https://medium.com/@Andrew.Steinwold/nft-valuation-lending-borrowing-putting-non-fungible-assets-to-work-ce92c61bad50, pp. 1-6.

* cited by examiner

ALLOCATION OF NON-FUNGIBLE TOKEN (NFT) BY CONTAINERIZED DATA STRUCTURES

TECHNICAL FIELD

The present implementations relate generally to electronic networks, and more particularly to allocation of non-fungible token (NFT) by containerized data structures.

INTRODUCTION

Consumers increasingly expect to conduct financial transactions involving multiple types of transaction denominations. Consumers increasingly expect to transfer assets across types that have values based on differing denominations. However, conventional systems cannot identify market characteristics that drive value of various digital assets, cannot accurately generate values for various digital assets classes with various scarcity characteristics, and cannot effectively execute transactions involving various digital assets.

SUMMARY

Aspects of this technical solution are directed to secure allocation of NFTs to various cryptographic keys associated with various accounts. This technical solution can include a communication interface compatible with an account system to receive from the account system an account token in connection with a request to allocate an NFT to one or more accounts. For example, an NFT can be transferred to a smart contract or secure container associated with a smart contract. The smart contract can allocate one or more portions of the NFT or quantitative values associated with one or more portions of the NFT. The smart contract can make allocations to indicate a division of quantitative value of the NFT, and can dynamically modify allocations to one or more accounts via cryptographic keys based on various thresholds. Thresholds can include time-based thresholds and triggers initiated by an account system. Thus, a technological solution for divided allocation of NFT by containerized data structures is provided.

At least one aspect is directed to a method to collateralize a non-fungible token (NFT) in a transaction. The method can include registering, by an account processor, a first non-fungible token (NFT) account of a customer to a first public and private key pair. The method can include registering, by the account processor, a second NFT account of a financial institution to a second public and private key pair. The method can include receiving, by a mobile wallet computing system from a customer computing device, a request to transfer to the first NFT account an NFT having a quantitative value. The method can include generating, by an NFT transaction processor, a second quantitative value of the NFT based on the quantitative value of the NFT and a quantitative value of fiat currency. The method can include transferring, by the NFT transaction processor to a smart contract, the NFT. The method can include linking, by the NFT transaction processor, the first public and private key pair to the smart contract and a fractional value of the NFT and linking, by the NFT transaction processor, the second public and private key pair to the smart contract and the second quantitative value of the NFT.

At least one aspect is directed to a system to collateralize a non-fungible token (NFT) in a transaction. The system can include memory and one or more processors. The system can register, by an account processor, a first non-fungible token (NFT) account of a customer to a first public and private key pair. The system can register, by the account processor, a second NFT account of a financial institution to a second public and private key pair. The system can receive, by a mobile wallet computing system from a customer computing device, a request to transfer to the first NFT account an NFT having a quantitative value. The system can generate, by an NFT transaction processor, a second quantitative value of the NFT based on the quantitative value of the NFT and a quantitative value of fiat currency. The system can transfer, by the NFT transaction processor to a smart contract, the NFT. The system can link, by the NFT transaction processor, the first public and private key pair to the smart contract and the fractional value of the NFT. The system can link, by the NFT transaction processor, the second public and private key pair to the smart contract and the second quantitative value of the NFT.

At least one aspect is directed to a computer readable medium can include one or more instructions stored thereon and executable by a processor. The processor can register, by a processor, a second NFT account of a financial institution to a second public and private key pair. The processor can receive, via a mobile wallet computing system from a customer computing device, a request to transfer to the first NFT account an NFT having a quantitative value. The processor can generate, a second quantitative value of the NFT based on the quantitative value of the NFT and a quantitative value of fiat currency. The processor can transfer, to a smart contract, the NFT. The processor can link, the first public and private key pair to the smart contract and the fractional value of the NFT. The processor can link, the second public and private key pair to the smart contract and the second quantitative value of the NFT.

BRIEF DESCRIPTION OF THE DRAWINGS

These and other aspects and features of the present implementations will become apparent to those ordinarily skilled in the art upon review of the following description of specific implementations in conjunction with the accompanying figures, wherein.

DETAILED DESCRIPTION

Figure 1:
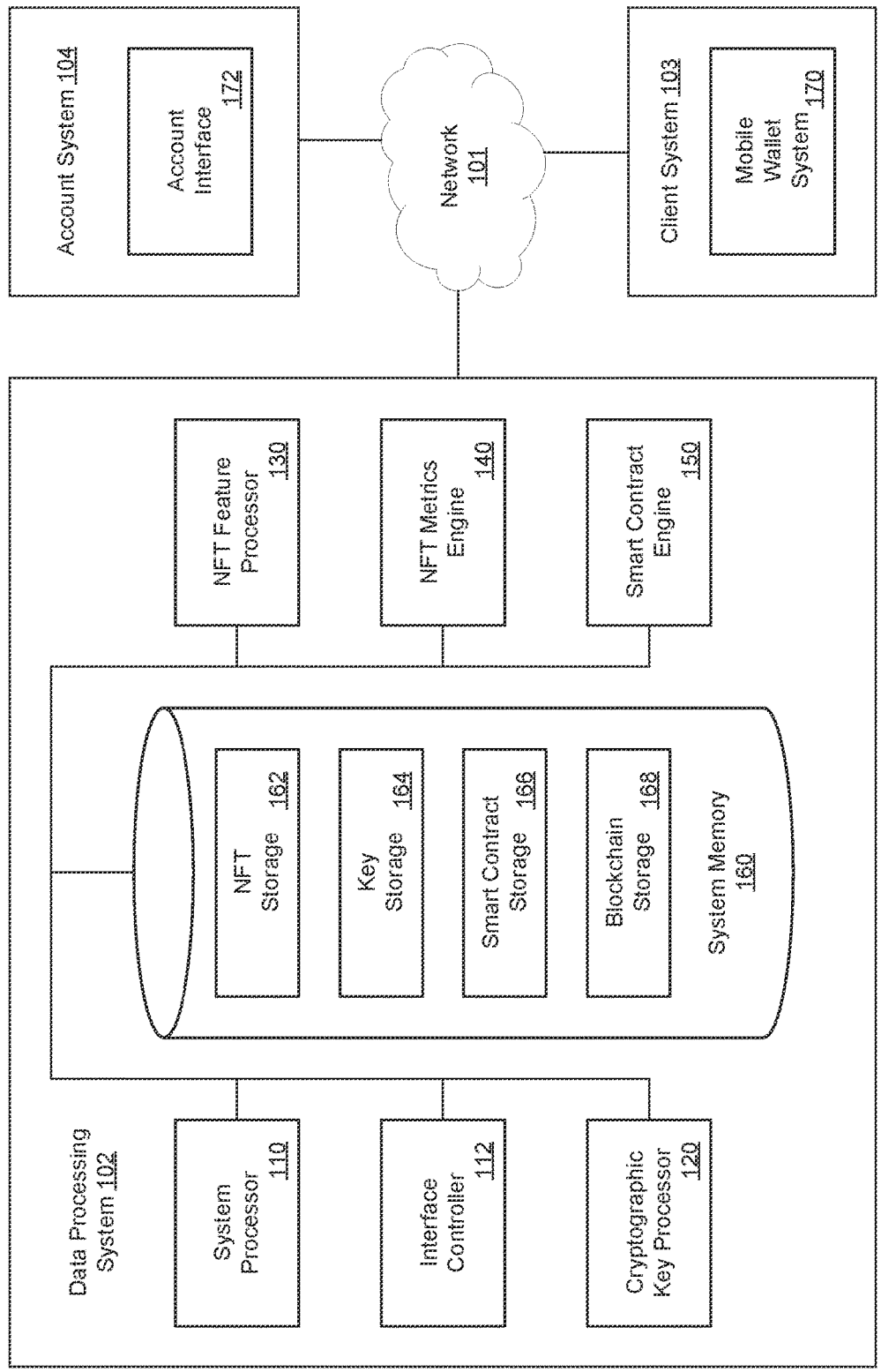
FIG. 1 depicts an example system, in accordance with present implementations.

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

NFT transfer processes can include multiple validation and authentication layers. However, various validation and authentication layers can potentially reduce transfer speeds and thus reduce effectiveness of FNTs as a transfer medium or transaction medium. Further, NFTs are part of an increasingly diverse transfer and transaction network environment, and interoperability in transfer infrastructure of NFTs with other types and classes of system objects is of increasing importance.

This technical solution is directed to generating and modifying NFTs to include secure allocation of one or more portions of the NFT to one or more entities. For example, this technical solution can receive an account token from an account system configured to control or administer various electronic financial accounts. The account token can be transmitted via an account interface having one or more of a protocol or interface configured to transmit cryptographic keys of the accounts, identifiers of the accounts, control instructions with respect to the account, or any combination thereof. For example, this technical solution can obtain public and private cryptographic keys corresponding to particular accounts at an account system, and can modify links between various accounts of the account system and various cryptographic keys. Thus, this technical solution can include at least the technical improvement of including components operable to modify an account system via a communication system configured to modify accounts at the account system.

This technical solution can include a smart contract configured to allocate one or more portions of an NFT based on one or more account criteria or transfer criteria. For example, the technical solution can receive a request to allocate a first portion of an NFT to a first account, and a second portion of the NFT to a second account. The technical solution can, in response to the request, generate or modify an smart contract to include the NFT and one or more cryptographic keys associated with one or more accounts linked with the request. For example, the smart contract can allocate 20% of an NFT to a first account of a buyer, and 80% of the NFT to a second account linked with a lender. The smart contract can change allocations over time or in response to a trigger. For example, the smart contract can vest a particular allocation over time or in response to an allocation trigger. The smart contract can, for example, store each allocation and include or reference cryptographic keys corresponding to each account, to link each account of the account system with the allocation of the NFT. Thus, this technical solution can provide a technical improvement directed at least to dividing and allocating NFTs with respect to external systems while eliminating destruction or reminting of the NFT.

FIG. 1 depicts an example system, in accordance with present implementations. As illustrated by way of example in FIG. 1, an example system 100 can include at least a network 101, a data processing system 102, a client system 103, and an account system 104.

The network 101 can include any type or form of network. The geographical scope of the network 101 can vary widely and the network 101 can include a body area network (BAN), a personal area network (PAN), a local-area network (LAN), e.g. Intranet, a metropolitan area network (MAN), a wide area network (WAN), or the Internet. The topology of the network 101 can be of any form and can include, e.g., any of the following: point-to-point, bus, star, ring, mesh, or tree. The network 101 can include an overlay network which is virtual and sits on top of one or more layers of other networks 101. The network 101 can include any such network topology as known to those ordinarily skilled in the art capable of supporting the operations described herein. The network 101 can utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite can include application layer, transport layer, internet layer (including, e.g., IPv6), or the link layer. The network 101 can include a type of a broadcast network, a telecommunications network, a data communication network, or a computer network.

The data processing system 102 can include a physical computer system operatively coupled or that can be coupled with one or more components of the system 100, either directly or directly through an intermediate computing device or system. The data processing system 102 can include a virtual computing system, an operating system, and a communication bus to effect communication and processing. The data processing system 102 can include a system processor 110, an interface controller 112, a cryptographic key processor 120, an NFT feature processor 130, an NFT metrics engine 140, a smart contract engine 150, and a system memory 160. a system processor 110, an interface controller 112, a cryptographic key processor 120, an NFT feature processor 130, an NFT metrics engine 140, a smart contract engine 150, and a system memory 160.

The system processor 110 can execute one or more instructions associated with the system 100. The system processor 110 can include an electronic processor, an integrated circuit, or the like including one or more of digital logic, analog logic, digital sensors, analog sensors, communication buses, volatile memory, nonvolatile memory, and the like. The system processor 110 can include, but is not limited to, at least one microcontroller unit (MCU), microprocessor unit (MPU), central processing unit (CPU), graphics processing unit (GPU), physics processing unit (PPU), embedded controller (EC), or the like. The system processor 110 can include a memory operable to store or storing one or more instructions for operating components of the system processor 110 and operating components operably coupled to the system processor 110. For example, the one or more instructions can include one or more of firmware, software, hardware, operating systems, embedded operating systems. The system processor 110 or the system 100 generally can include one or more communication bus controller to effect communication between the system processor 110 and the other elements of the system 100.

The interface controller 112 can link the data processing system 102 with one or more of the network 101, the client system 103, and the account system 104, by one or more communication interfaces. A communication interface can include, for example, an application programming interface ("API") compatible with a particular component of the data processing system 102, the client system 103, or the account system 104. The communication interface can provide a particular communication protocol compatible with a particular component of the data processing system 102 and a particular component of the client system 103 or the account system 104. The interface controller 112 can be compatible with particular content objects, and can be compatible with particular content delivery systems corresponding to particular content objects. For example, the interface controller 112 can be compatible with transmission of video content, audio content, or any combination thereof. For example, the interface controller 112 can be compatible with payment processing transmissions by a protocol compatible with payment processing latency and encryption structures.

The cryptographic key processor 120 can generate and modify cryptographic keys. For example, the cryptographic key processor 120 can include one or more asymmetric or symmetric key generators, and can generate public-private key pairs. For example, a public-private key pair can include a public key configured to encrypt in accordance with a particular transform process. For example, a public-private key pair can include a private key configured to decrypt in accordance with a particular transform process compatible with the public key. The cryptographic key processor 120 can link the public-private key pair with any individual object or component. The cryptographic key processor 120 can link any public key or private key corresponding to the public-private key pair with any individual object or component. For example, the cryptographic key processor 120 can generate a key compatible with or linked with a particular identifier corresponding to a particular, device, user, customer, account, system, or any combination thereof.

The NFT feature processor 130 can identify one or more characteristics of one or more NFTs. For example, the feature processor 130 can identify one or more characteristics of an individual NFT or a plurality of NFTs satisfying one or more criteria. The NFT feature processor 130 can generate a particular feature corresponding to one or more characteristics of an NFT or an object linked with the NFT. For example, a feature can include a scalar or vector quantity corresponding to one or more vales of an aspect of an NFT. For example, a feature can include a list of coordinates corresponding to a line identified in an image linked with an NFT. For example, a feature can include a numeric value corresponding to an identifier of an NFT. For example, criteria by which NFTs can be identified can include aspects of the NFT, fields or components of the NFT, transform processes used to generate or modify the NFT, aspects of a content object linked with the NFT, or any combination thereof. For example, aspects of the NFT can include a hash of the NFT, or a value of an individual field of the NFT. For example, aspects of the NFT can include a hash of the NFT, or a value of an individual field of the NFT. For example, aspects of a content object linked with the NFT can include a bitmap of an image linked with the NFT, or a hash of a media content linked with the NFT. Media content can include images, audio, three-dimensional (3D) models, or any combination thereof.

The NFT metrics engine 140 can generate and modify one or more metrics based on one or more NFTs. For example, the NFT metrics engine 140 can generate a metric based one or more features obtained from the NFT feature processor 130. For example, the NFT metrics engine 140 can generate a metric to indicate a particular value or type of a particular NFT. The NFT metrics engine 140 can generate metrics compatible with particular thresholds. For example, the thresholds can activate particular transforms of an aspect of an NFT, feature or metric. For example, the thresholds can execute one or more instructions corresponding to a particular NFT or type of NFT, type of object linked an NFT, or any combination thereof. For example, the NFT metrics engine 140 can determine that a particular metric having a particular value and based on a type of an NFT satisfies a threshold that indicates a particular value compatible with the particular value of the metric.

The smart contract engine 150 can generate and modify one or more smart contracts. The smart contract engine 150 can execute instructions to generate or modify a cryptographic container, to add or remove objects from a cryptographic container, and to execute various processors linked with or embedded with a smart contract. For example, the smart contract engine 150 can execute various processors of a smart contract in response to an indication from the NFT metrics engine 140 that a metric satisfies a particular threshold. For example, the smart contract engine 150 can execute various processors of a smart contract in response to detecting input including or corresponding to a particular token at the smart contract. For example, the smart contract engine 150 can include processors to read, write, generate, or modify one or more objects contained within a container of the smart contract, one or more tokens input to the smart contract, or one or more processors of the smart contract.

The system memory 160 can store data associated with the system 100. The system memory 160 can include one or more hardware memory devices to store binary data, digital data, or the like. The system memory 160 can include one or more electrical components, electronic components, programmable electronic components, reprogrammable electronic components, integrated circuits, semiconductor devices, flip flops, arithmetic units, or the like. The system memory 160 can include at least one of a non-volatile memory device, a solid-state memory device, a flash memory device, and a NAND memory device. The system memory 160 can include one or more addressable memory regions disposed on one or more physical memory arrays. A physical memory array can include a NAND gate array disposed on, for example, at least one of a particular semiconductor device, integrated circuit device, and printed circuit board device. The system memory 160 can include an NFT storage 162, a key storage 164, a smart contract storage 166, and a blockchain storage 168.

The NFT storage 162 can include NFTs associated with the data processing system 102 or any component thereof, the client system 103 or any component thereof, any content object, or any combination thereof. The key storage 164 can store cryptographic keys associated with the data processing system 102 or any component thereof, the client system 103 or any component thereof, any content object, or any combination thereof. For example, the key storage 164 can include public-private key pairs or private keys corresponding to particular accounts, NFTs, smart contracts, devices, users, systems, or any combination thereof. The smart contract storage 166 can store one or more smart contracts and corresponding addresses for particular smart contracts that indicate links with the corresponding smart contracts. The blockchain storage 168 can store one or more blockchains linked to one or more smart contracts, tokens, containers, or content objects, by corresponding addresses for particular smart contracts, tokens, containers, or content objects that indicate links with a particular blockchain.

For example, the computer readable medium can include one or more instructions executable by the processor. The processor can modify, by the smart contract and in response to a transfer of a second quantitative value of fiat currency to a first fiat currency account registered to the second public and private key pair, the second quantitative value of the NFT. The processor can modify, by the smart contract and in response to the transfer of the second quantitative value of fiat currency from a second fiat currency account registered to the first public and private key pair, the fractional value of the NFT.

The client system 103 can include a computing system located remotely from the data processing system 102. The client system 103 can include a mobile wallet system 170. The mobile wallet system 170 can include an interface to execute instructions corresponding to a particular wallet account, and to modify the structure or contents of a particular smart contract corresponding to a wallet account. For example, the mobile wallet system 170 can include a user interface to receive input that indicates selections of various NFTs, transactions, accounts, devices, users, or systems. For example, the user interface can include a graphical user interface that can be presented at a display device. The display device can display at least one or more user interface presentations, and can include an electronic display. An electronic display can include, for example, a liquid crystal display (LCD), a light-emitting diode (LED) display, an organic light-emitting diode (OLED) display, or the like. The display device can receive, for example, capacitive or resistive touch input. The mobile wallet system 170 can transmit one or more instructions, tokens, keys, or any combination thereof to, from, or with the data processing system 102.

The account interface 172 can communicate with one or more external systems compatible with allocating an NFT. For example, the account interface 172 can include an application programming interface (API) compatible with the account system 104 and the interface controller 112. For example, the account interface 172 can be configured to receive characteristics associated with particular NFTs, accounts, or content objects linked with particular NFTs. For example, the account interface 172 can be configured to receive identifiers corresponding to various NFTs linked with a particular account, account control instructions, currency or asset transfer instruction, or any combination thereof. The account interface 172 can thus provide the technical improvement of detecting and transmitting metrics generated to allocate an NFT between storage locations or blockchain locations. The account interface 172 can provide the technical improvement of providing a communication interface compatible with particular NFT transfer operations.

Figure 2:
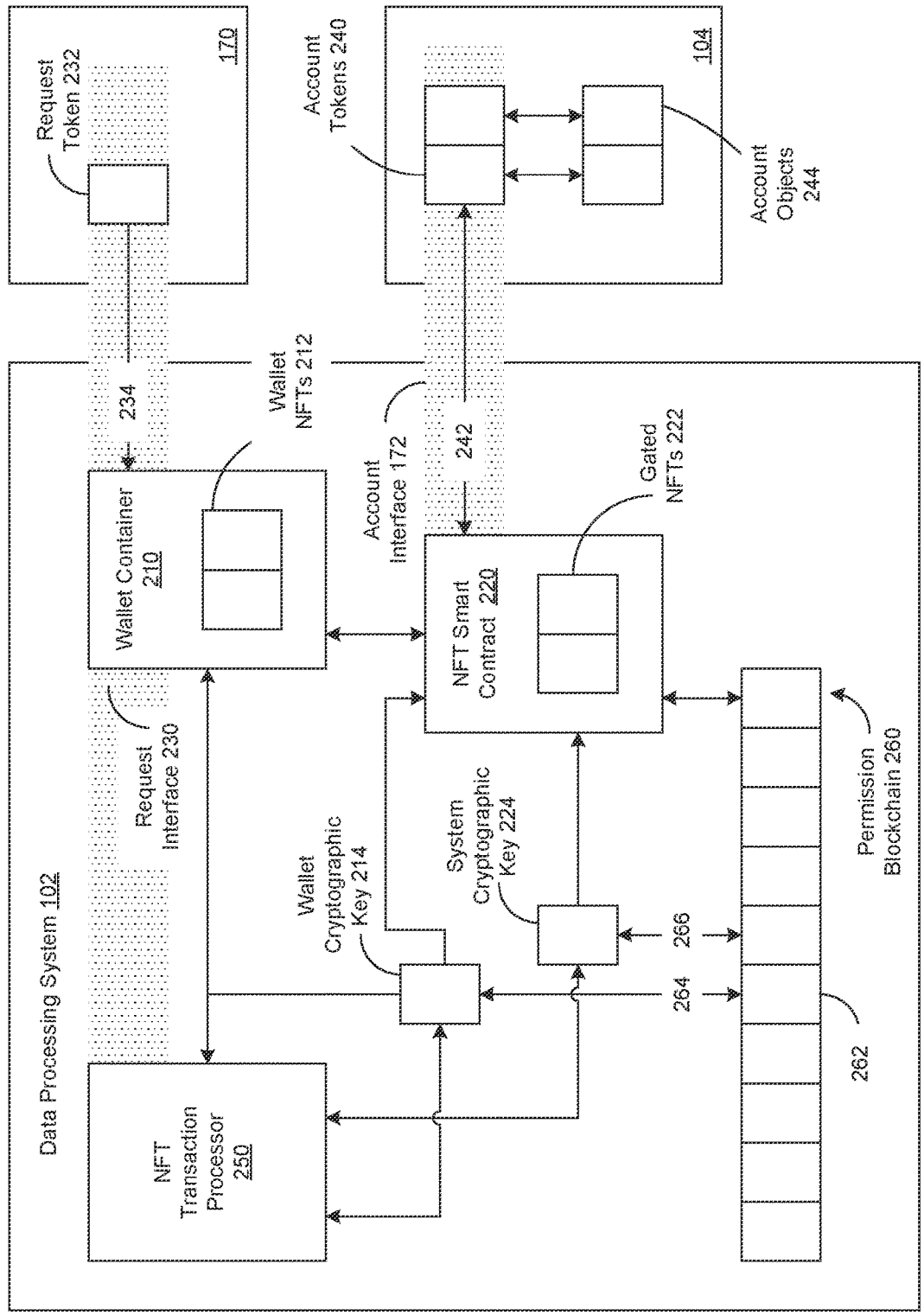
FIG. 2 depicts an example system architecture, in accordance with present implementations.

FIG. 2 depicts an example system architecture, in accordance with present implementations. As illustrated by way of example in FIG. 2, an example system architecture 200 can include at least the data processing system 102, the account system 104, the mobile wallet system 170, a wallet container 210, a wallet cryptographic key 214, an NFT smart contract 220, gated NFTs 222, a system cryptographic key 224, a request interface 230, account tokens 240, an account transmission 242, account objects 244, an NFT transaction processor 250, and a permission blockchain 260.

The wallet container 210 can include one or more NFTs and keys corresponding to a various accounts and linked with a particular user or device. For example, the wallet container 210 can encapsulate one or more NFTs linked with a particular user within a secure container, and can include an interface compatible with the NFT transaction processor 250, the NFT account system 104, and the account interface 170. The wallet container 210 can include wallet NFTs 212. The wallet NFTs 212 can each include a particular NFT and can correspond to particular content objects. An NFT of the wallet NFTs 212 can be associated with a particular content object, and can be required to transmit output of the content object, transfer the content object to another storage location, or any combination thereof, for example. Each of the wallet NFTs 212 can indicate control of a particular content by a particular user linked with the wallet container 210 via a cryptographic key or key pair. The wallet container 210 can include one or more wallet NFTs 212.

The wallet cryptographic key 214 can include a key compatible with the wallet container 210. The wallet container 210 can execute a transaction or modify contents of the wallet container 210 in response to detecting input including the wallet cryptographic key 214. The wallet cryptographic key 214 can, for example, include a public-private key pair, a public key, or a private key compatible with the wallet container 210. The wallet container 210 can permit access to the wallet NFTs 212 based on the wallet cryptographic key 214, for example, compatible with the encapsulation layer and operable to decrypt the encryption corresponding to the encapsulation layer.

The NFT smart contract 220 can include one or more instructions to restrict or execute transfer of one or more of the gated NFTs 222. The NFT smart contract 220 can correspond to an executable smart contract and can include a gateway component. The gateway component can include one or more instructions to restrict or execute transfer one or more of the gated NFTs 222 in the absence of presence of one or more tokens compatible with the NFT smart contract 220. The NFT smart contract 220 can include an encapsulation layer that, for example, maintains the gated NFTs 222 in an encrypted state. The NFT smart contract 220 can permit access to the gated NFTs 222 based on a private key, for example, compatible with the encapsulation layer and operable to decrypt the encryption corresponding to the encapsulation layer. The gateway component can be compatible with and interface with the request interface 230, and the encapsulation layer can be integrated with the NFT smart contract 220. The NFT smart contract 220 can be registered to the blockchain 260 by a block link with the blockchain 260.

The gated NFTs 222 can each include a particular NFT and can correspond to particular content objects. An NFT of the gated NFTs 222 can be transferred from or to the wallet container 210, for example. For example, each of the gated NFTs 222 can indicate control of a particular content by a particular user linked with the NFT smart contract 220 via the system cryptographic key 224. The system cryptographic key 224 can include a key compatible with and controlled by the data processing system 102. Transmission of the system cryptographic key 224 can be restricted by the data processing system 102 to within the data processing system 102. For example, the system cryptographic key 224 can correspond to a "backup key" or "house key" that must be detected in order to activate processors or decrypt containers of the NFT smart contract 220. Thus, the system cryptographic key 224 can restrict authorization by the NFT smart contract 220 to the data processing system 102 environment.

The request interface 230 can include a communication channel between one or more of the smart contract control structure 210, the system cryptographic key 224 at the data processing system 102, and the request token 232 at the mobile wallet system 170. The request interface 230 can include an application programming interface compatible with the wallet container 210 to detect the system cryptographic key 224 at the data processing system 102, and the request token 232 at the client system 103. At least the request interface 230 or the wallet container 210 can execute one or more instructions to determine whether one or more of system cryptographic key 224 and the request token 232 are compatible with the wallet container 210. The request interface 230 can include a request token 232, and a request transmission 234.

The request token 232 can identify an NFT and can identify one or more characteristics linked with the NFT or corresponding to a request to allocate the NFT. For example, the request token 232 can include an identifier of the NFT, a hash of the NFT, an identifier of one or more accounts of the account system 104 linked with the NFT, one or more accounts of the account system 104 linked with the request to allocate the NFT, an identifier of a public-private key pair or any portion thereof, one or more request allocation metrics or any combination thereof. For example, an allocation metric can include or reference an account, and an allocation value, an allocation fraction, or an allocation percentage or that account. For example, an allocation metric can include an allocation modification metric. The allocation modification metric can include a trigger or criterion to modify an allocation. The allocation modification metric can correspond to an instruction to allocate a fraction of an NFT from a first account to a second account in response to receiving a payment at the first account or a third account associated with the first account or a cryptographic key of the first account. For example, the smart contract 220 can transfer 1% of an allocation of the NFT from a key pair corresponding to a first account, to a key pair corresponding to a second account, in response to detecting or receiving an indication of a payment of $1,000 to a fiat currency account.

For example, the request token 232 can include an identification of a public-private key pair corresponding to an NFT or a wallet container of an NFT. For example, the request token 232 can include an identification of a public-private key pair corresponding to a smart contract. For example, the request token 232 can include an identification of a public-private key pair corresponding to a wallet container of a financial institution. The request transmission 234 can transmit the request token 232 from the client system 103 or the mobile wallet system 170 to the data processing system 102 or the wallet container 210.

The account tokens 240 can identify various account characteristics and account operations. For example, the account tokens 240 can variously include an identifier of an smart contract, a hash of the smart contract, an identifier of one or more accounts of the account system 104 linked with the NFT, one or more accounts of the account system 104 linked with the request to allocate the NFT, an identifier of a public-private key pair or any portion thereof, one or more request allocation metrics or any combination thereof. The account transmission 242 can include a technical improvement of at least including a format, protocol, or the like compatible with the account system 104, by detecting or transmitting aspects or characteristics of the particular accounts of the account system 104. The account objects 244 can identify various account records. For example, the account objects 244 can variously include an identifier of a financial account of the account system 104. For example, the account objects 244 can variously include metrics corresponding to a denomination or value of the account, and can include links or references to various objects associated therewith. For example, various objects associated with accounts can include NFTs, MBC, fiat currency, or any combination thereof.

The content objects can each include a particular data or instructions. A content object can correspond to a collections of executable instructions or data that can be finite. For example, a content object can include a video file corresponding to a limited number of instances of video content. For example, a content object can include an audio file corresponding to a limited number of instances of audio content. For example, a content object can include a metric that increases with limited capacity, such as a physical measurement a financial instrument valuation, a periodic output based on a physical or scarce property, or any combination thereof.

The NFT transaction processor 250 can execute one or more actions with respect to various cryptographic keys, NFTs, containers, and smart contracts. For example, the NFT transaction processor 250 can modify links between various containers, NFTs, and smart contracts with various public-private key pairs. The transaction processor 250 can transfer public-private key pairs based on one or more operations of the cryptographic key processor 120, for example. The NFT transaction processor 250 can generate and modify one or more metrics corresponding to various NFTs, including wallet NFTs 212, gated NFTs 222, and exchange NFTs 240, based on one or more operations of the NFT feature processor 130 or the NFT metrics engine 140. The NFT transaction processor 250 can generate or modify one or more containers, accounts, or smart contracts, based on one or more operations of the smart contract engine 150.

The permission blockchain 260 can include at least one blockchain including one or more of the blocks 262. The permission blockchain 260 can be linked with one or more content objects 224, secure NFTs 240, and smart contract control structures 210. The permission blockchain 260 can include a blockchain operated and controlled at the data processing system 102. The permission blockchain 260 can include a plurality of blockchains each corresponding to particular aspects of the links associated with the corresponding blockchains. The permission blockchain 260 can include blocks 262, a wallet cryptographic key link 264, and a system cryptographic key link 266. The blocks 262 can include or store links to one or more objects associated with the blockchain. The wallet cryptographic key link 264 can include a reference, pointer, or the like, to or between a block among the blocks 262 and the wallet cryptographic key 214 associated with that particular block. The system cryptographic key link 266 can include a reference, pointer, or the like, to or between a block among the blocks 262 and the system cryptographic key 224 associated with that particular block. For example, the system can transfer, by the NFT transaction processor to the smart contract, one or more of the fractional value of the NFT and the second quantitative value of the NFT.

For example, the system 100 can transfer, by the NFT transaction processor to the smart contract, the first public and private key pair to the smart contract 220 from the NFT. For example, the system 100 can transfer, by the NFT transaction processor to the smart contract 220, the NFT from a third public and private key pair registered to a third NFT account of a second customer. For example, the second customer can correspond to a seller of an NFT. The smart contract can correspond to a transfer restriction of the NFT, held as collateral at the smart contract. The smart contract 220 can be linked with cryptographic keys for an account of a buyer, and indicate a first allocation of the NFT to the buyer. The first allocation can correspond to an equity position of the buyer in the NFT. The smart contract 220 can be linked with cryptographic keys for an account of a financial institution, and indicate a second allocation of the NFT to the financial institution. The second allocation can correspond to a lien position of the financial institution in the NFT.

For example, the system can modify, by the smart contract and in response to a transfer of a second quantitative value of fiat currency to a first fiat currency account registered to the second public and private key pair, one or more of the fractional value of the NFT and the second quantitative value of the NFT. For example, the system can modify, by the smart contract and in response to a transfer of a second quantitative value of fiat currency from a second fiat currency account registered to the first public and private key pair, one or more of the fractional value of the NFT and the second quantitative value of the NFT. For example, the smart contract 220 can include instructions to change allocation of the NFT in response to a threshold or trigger. For example, the threshold and trigger can correspond to those with respect to the request token 232, or can be generated by the smart contract in accordance with predetermined metrics.

For example, the system can transfer, by the NFT transaction processor in response to one or more transfers of fiat currency from a fiat currency account registered to the first public and private key pair, the first public and private key pair from the smart contract to the first NFT. The system can unlink, by the NFT transaction processor, the second public and private key pair from the smart contract and the second quantitative value of the first NFT. For example, the smart contract can, in response to receive an indication of or detect that a predetermined number of fiat currency transaction have occurred with respect a predetermined account, or that a modification of allocation results in an allocation of 0 or 0% with respect to a particular cryptographic key pair. in response to receiving the indication or the detecting, the smart contract can unlink the cryptographic key pair corresponding to the 0 or 0% allocation. For example, the system can include a value of the transfers of fiat currency satisfying a threshold corresponding to the second quantitative value of the NFT.

For example, the system can generate, by the NFT transaction processor, the second quantitative value of the first NFT based on a difference between the quantitative value of the first NFT and the quantitative value of fit currency. For example, the difference can correspond to a remaining value of the NFT in fiat currency or MBC currency and an amount of fiat currency or MBC currency corresponding to a down payment or equity amount.

Figure 3:
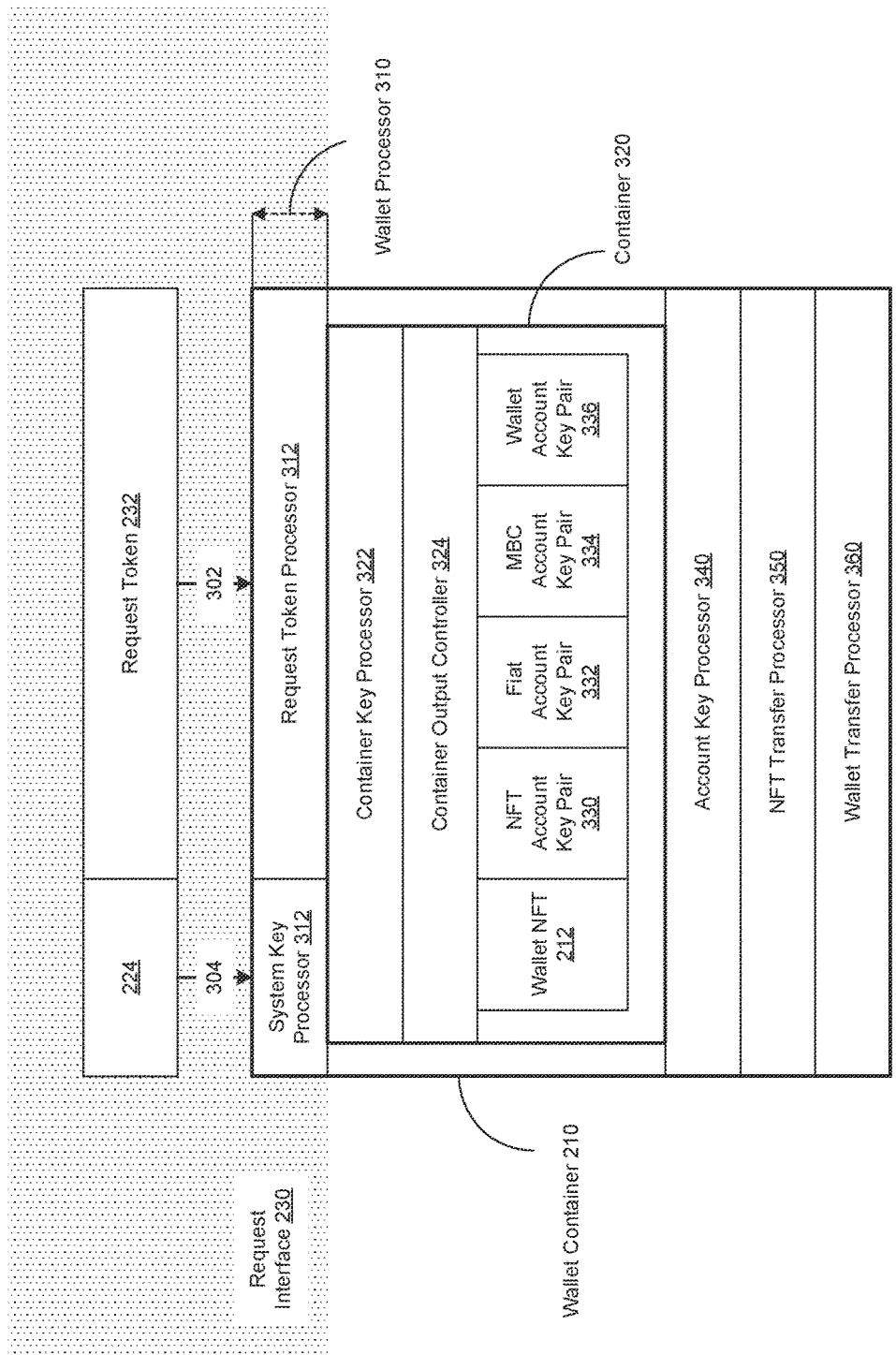
FIG. 3 depicts an example wallet system architecture, in accordance with present implementations.

FIG. 3 depicts an example wallet system architecture, in accordance with present implementations. As illustrated by way of example in FIG. 3, an example wallet system architecture 300 can include at least a request token transmission 302, a system key transmission 304, a wallet processor 310, a container 320, a container key processor 322, an account key processor 340, an NFT transfer processor 350, and a wallet transfer processor 360. The request token transmission 302 can be responsive to an action by the request interface 230 to transmit the request token 232 to the wallet container 210. The system key transmission 304 can be responsive to an action by the request interface 230 to transmit the system cryptographic key 224 to the wallet container 210.

The wallet processor 310 can communicate with and validate various tokens and NFTs. The wallet processor 310 can include one or more interfaces corresponding to an API or a smart contract interface, for example. A smart contract interface can include one or more executable instructions integrated with a smart contract. The smart contract interface can execute instructions at the smart contract or triggered by the smart contract in response to detection of objects or conditions external to the smart contract. The wallet processor 310 can comprise at least a portion of a control structure of the smart contract. The wallet processor 310 can include a system key processor 312, and a request token processor 314.

The system key processor 312 can detect the presence of the system cryptographic key 224, and can determine whether the system cryptographic key 224 is compatible with the system key processor 312. The system key processor 312 can be configured to be compatible with a particular system cryptographic key 224, or can be generated to be compatible with a particular system cryptographic key 224. For example, the system key processor 312 can be integrated with or store a hash based on a particular system cryptographic key 224 and a hash processor operable to generate a hash based on any system cryptographic key 224. For example, the system key processor 312 can include a public key or a private key of a key pair of a particular system cryptographic key 224, and can authenticate at least a portion of the system cryptographic key 224 based on a hash or comparison with the portion of the system cryptographic key 224. The system key processor 312 can generate a hash in response to detecting the presence of the system cryptographic key 224, and can determine whether the system cryptographic key 224 is compatible with the smart contract control structure, in response generating the hash, by comparing the generated hash with the stored hash. The system key processor 312 can include logic to detect a system cryptographic key 224 passed to it, by, for example, a JSON object or a header argument.

The request token processor 314 can detect the system cryptographic key 224 obtained by the wallet container 210 via the wallet processor 310. The request token transmission 302 can be responsive to an action by the request interface 230 to transmit the request token 232 to the wallet container 210. The request token processor 314 can detect the request token 232 obtained by the wallet container 210 via the request token processor 314. The wallet NFT 212 can correspond to at least one of the wallet NFTs 212.

The container 320 can include a security layer that restrict access to one or more of the NFTs or cryptographic keys. The container 320 can include, for example, a security encapsulation that partially or completely encrypts one or more components of the container 320. The container 320 can include a wallet NFT 212, a container output controller 324, an NFT account key pair 330, a fiat account key pair 332, a MBC account key pair 334, and a wallet account key pair 336.

The container key processor 322 can detect the presence of a cryptographic key, and can determine whether the cryptographic key is compatible with the container 330. The container key processor 332 can obtain the cryptographic key from the request token 232, for example. For example, the private key can be stored entirely within the request token 250. For example, the request key can be stored entirely within the system cryptographic key 224 to restrict output from the container to the logical location corresponding to the system cryptographic key 224. For example, the cryptographic key can be stored partially within the system cryptographic key 224 and partially within the request token 232, to restrict output from the container to the logical location corresponding to the system cryptographic key 224 by a distributed key.

The container output controller 324 can selectively transfer at least NFTs and cryptographic keys from and to the container 320 based on determinations from the container key processor 322. For example, the container output controller 324 can transfer an NFT to the container 320 in response to a determination that the cryptographic key is compatible with the container key processor 322. The container 320 can include any number or combination of zero or more NFTs and zero or more keys, and is not limited to the examples illustrated herein.

The NFT account key pair 330 can correspond to a cryptographic key pair linked with a particular NFT account. For example, the NFT account key pair 330 can be executed at an account system to authorize a particular action at the account system. For example, an action can include transferring an NFT to a particular account or smart contract. For example, an action can include registering an NFT to a particular blockchain or user, or any combination thereof.

The fiat account key pair 332 can correspond to a cryptographic key pair linked with a particular fiat account. For example, the fiat account key pair 232 can be executed at an account system to authorize a particular action at the account system. For example, an action can include modifying an account database to indicate transfer of an amount of fiat currency to a particular account or smart contract. For example, an action can include registering a fiat currency account to a particular blockchain or user, or any combination thereof.

The MBC account key pair 334 can correspond to a cryptographic key pair linked with a particular MBC account. For example, the MBC account key pair 334 can be executed at an account system to authorize a particular action at the account system. For example, an action can include modifying an account database to indicate transfer of an amount of MBC currency to a particular account or smart contract. For example, an action can include registering an MBC currency account to a particular blockchain or user, or any combination thereof.

The wallet account key pair 336 can correspond to a cryptographic key pair linked with a wallet container. For example, the wallet account key pair 336 can be lined with a wallet container to which or from which contents of the wallet container or the wallet container itself can be transferred.

The account key processor 340 can generate, transfer, and modify various cryptographic keys. The account key processor 340 can transfer one or more of the account key pairs 330, 332 and 334 to or from the container 320 of the wallet container 210. For example, the account key processor 340 can transfer a cryptographic key pair, a public key, a private key, a symmetric key, or any combination thereof, to or from the container 320 to indicate a change in control of a particular account to the wallet container. The account key processor 340 can authenticate the wallet container 210 to a particular account system based on a key of the container 320. For example, the account key processor 340 can identify an NFT account associated with the NFT account key pair 330. For example, the account key processor 340 can transmit a hash based on the NFT account key pair 330 to an NFT account associated with the NFT account key pair 330, to authenticate the wallet container 210 to the NFT account associated with the NFT account key pair 330. The NFT transfer processor 350 can transfer and modify various NFTs. The NFT transfer processor 350 can transfer the wallet NFT to or from the container 320 of the wallet container 210. For example, the NFT transfer processor 350 can transfer an NFT in response to an indication by the account key processor 340 that the account is linked with and authorized to a particular NFT account.

The wallet transfer processor 360 can execute a transfer of contents of the wallet container or the wallet container 210 to a wallet container linked with the wallet account key pair 336, in response to detecting or receiving an indication of a wallet transfer event. For example, a wallet transfer event can include death of an individual linked with the wallet container. Here, the wallet account key pair 336 can be linked with a beneficiary of the account.

Figure 4:
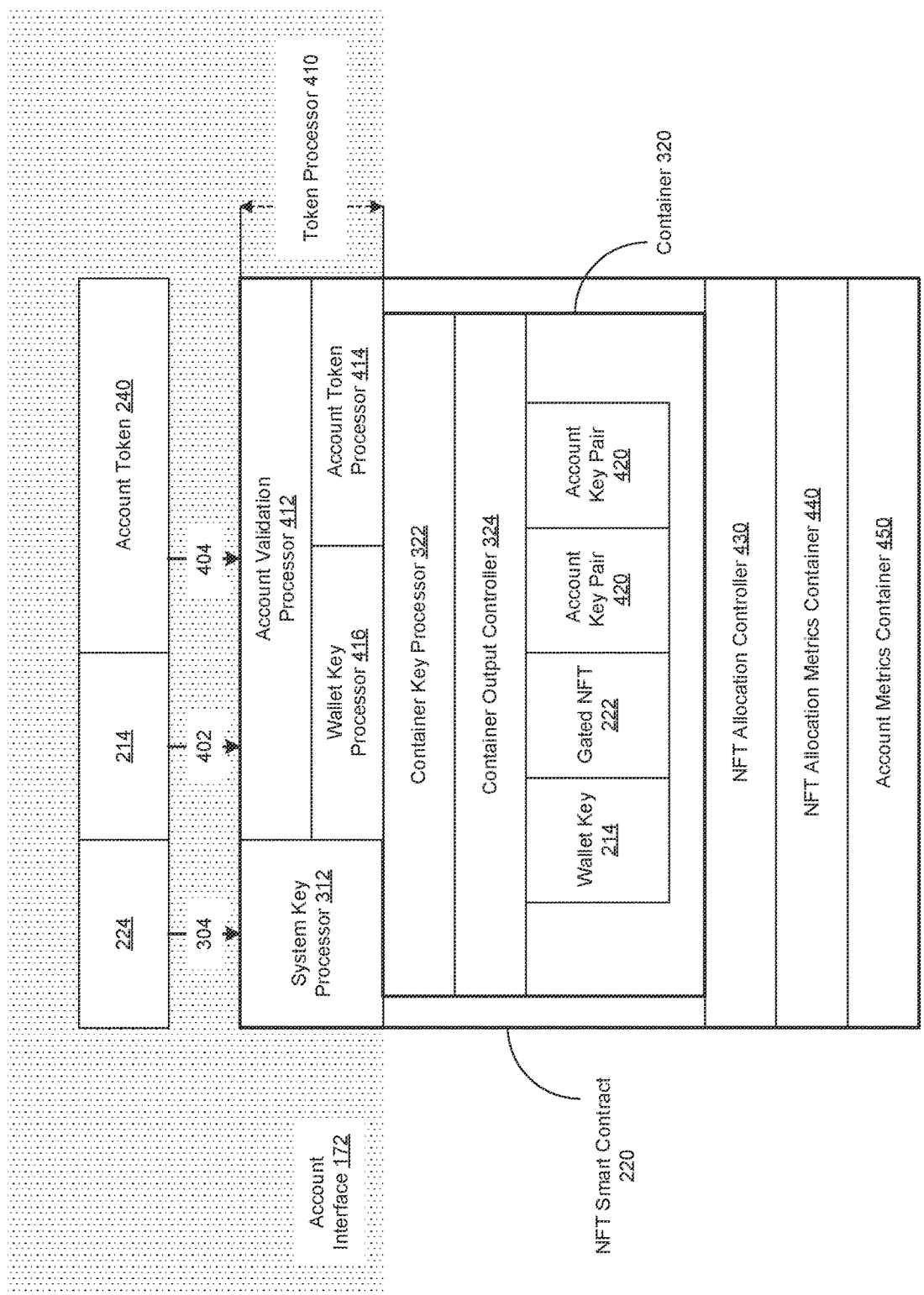
FIG. 4 depicts an example smart contract system architecture, in accordance with present implementations.

FIG. 4 depicts an example smart contract system architecture, in accordance with present implementations. As illustrated by way of example in FIG. 4, an example smart contract system architecture 400 can include at least a wallet key transmission 402, an account token transmission 404, a token processor 410, an NFT allocation controller 430, an NFT allocation metrics container 440, and an account metrics container 450. The wallet key transmission 402 can be responsive to an action by the account interface 172 to transmit the wallet cryptographic key 214 to the wallet container 210. The account token transmission 404 can be responsive to an action by the account interface 172 to transmit the account token 240 to the wallet container 210.

The token processor 410 can detect presence of a token, and can transmit the token to a token processor compatible with that particular token. The token processor 410 can include an account validation processor 412, an account token processor 414, and a wallet key processor 416.

The account validation processor 412 can determine whether an account associated with the account key pair 420 of the container 320 of the NFT smart contract 220 is compatible with a transfer. For example, the account validation processor 412 can include one or more metrics indicating that a gated NFT 222 can be allocated in accordance with the NFT smart contract 220. For example, a particular NFT in the container 320 of the wallet container 210 may be incompatible with allocation to multiple account key pairs by a minting restriction. For example, the NFT validation processor 412 can include or reference an allocation restriction linked with a minting restriction, and can block execution of a partial or full allocation of the NFT from or to the account key pair 420 of the smart contract 220 in response to detecting the minting restriction or transfer restriction. For example, the account validation processor 412 can include or reference an allocation authorization linked with a minting parameter, and can permit or initiate execution of a partial or full allocation of the NFT from or to the smart contract 220 in response to detecting the minting parameter linked with the allocation authorization. For example, the account validation processor 412 can link with a wallet container 310 and receive an identification of or reference to a particular NFT. The NFT validation processor 412 can then determine one or more characteristics or aspects of an NFT associated with a request to transfer that NFT, in response to receiving a transmission from or via the wallet container 320.

The account token processor 414 can detect the presence of the account token 240, and can extract one or more metrics, parameters, aspects, or values, or any combination thereof, from the account token 240. The NFT exchange token processor 414 can be configured to be compatible with the account token 240, the account interface 172, or the account system 104. Thus, the account token processor 414 can provide a technical improvement of direct communication between the data processing system 102, the mobile wallet system 170, and the account system 104. The account token processor 414 can include a token profile or account profile corresponding to a particular account system and compatible with a particular account token.

The wallet key processor 416 can detect the presence of the wallet cryptographic key 214, and can extract one or more metrics, parameters, aspects, or values, or any combination thereof, from the NFT exchange token 416. The NFT exchange token processor 414 can be configured to be compatible with the NFT exchange token 416, the account interface 172, or the NFT exchange system 104. Thus, the NFT exchange token processor 414 can provide a technical improvement of direct communication between the data processing system 102, the mobile wallet system 170, and the account system 104.

The NFT allocation controller 430 can generate and modify allocation metrics corresponding to various cryptographic keys and various NFTs. For example, the NFT allocation controller 430 can detect or receive an indication of an allocation event, and can determine to modify one or more allocation metrics based on the allocation event. The NFT allocation controller 430 can modify allocation metrics corresponding to one or more NFTs in response to allocation events directed variously to different NFTs. The NFT allocation controller 430 can modify allocation metrics corresponding to one or more cryptographic keys liked with corresponding accounts, in response to allocation events directed to an NFT allocation to one or more of the cryptographic keys. The NFT allocation controller 430 can obtain an allocation template or various allocation metrics from the The NFT allocation metrics container 440 can store allocation metrics corresponding to various cryptographic keys and various NFTs. The allocation metrics can include values, templates, or any combination thereof corresponding to allocations of an NFT between various cryptographic keys, or criteria for modifying allocations of an NFT between various cryptographic keys. For example, the NFT allocation metrics container 440 can includes values indicating absolute allocations, fractional allocations, percentage allocations, or any combination thereof, of NFTs. An absolute allocation can correspond to an amount of allocation, and can be denomination in fiat currency or MBC currency. Thus, an absolute allocation in fiat currency can correspond to an allocation of $100 to a first cryptographic key pair. A fractional allocation can include, for example, an allocation of 12 or 0.5 of a total of 1, and a percentage allocation can include, for example, an allocation of 50% of a total of 100. The NFT allocation metrics container 440 can include a template indicating or controlling modification of allocation with respect to various NFTs or cryptographic key pairs. For example, the template can include a frequency or timestamps indicating transfers to trigger a modification of allocation. For example, the template can include an amount in fiat currency or MBC indicating transfers to trigger a modification of allocation. For example, the template can include a cryptographic key pair associated with an account to be monitored at the account system to detect transfers to trigger a modification of allocation.

The account metrics container 450 can store account metrics corresponding to various cryptographic keys and accounts. For example, the account metrics container 450 can store identifiers to particular accounts at the account system 104, access token to particular accounts at the account system 104, account data received via the request token 232, or any combination thereof. Thus, the account metrics container 450 can maintain and validate associations between particular cryptographic keys and accounts associated with those particular cryptographic keys.

Figure 5:
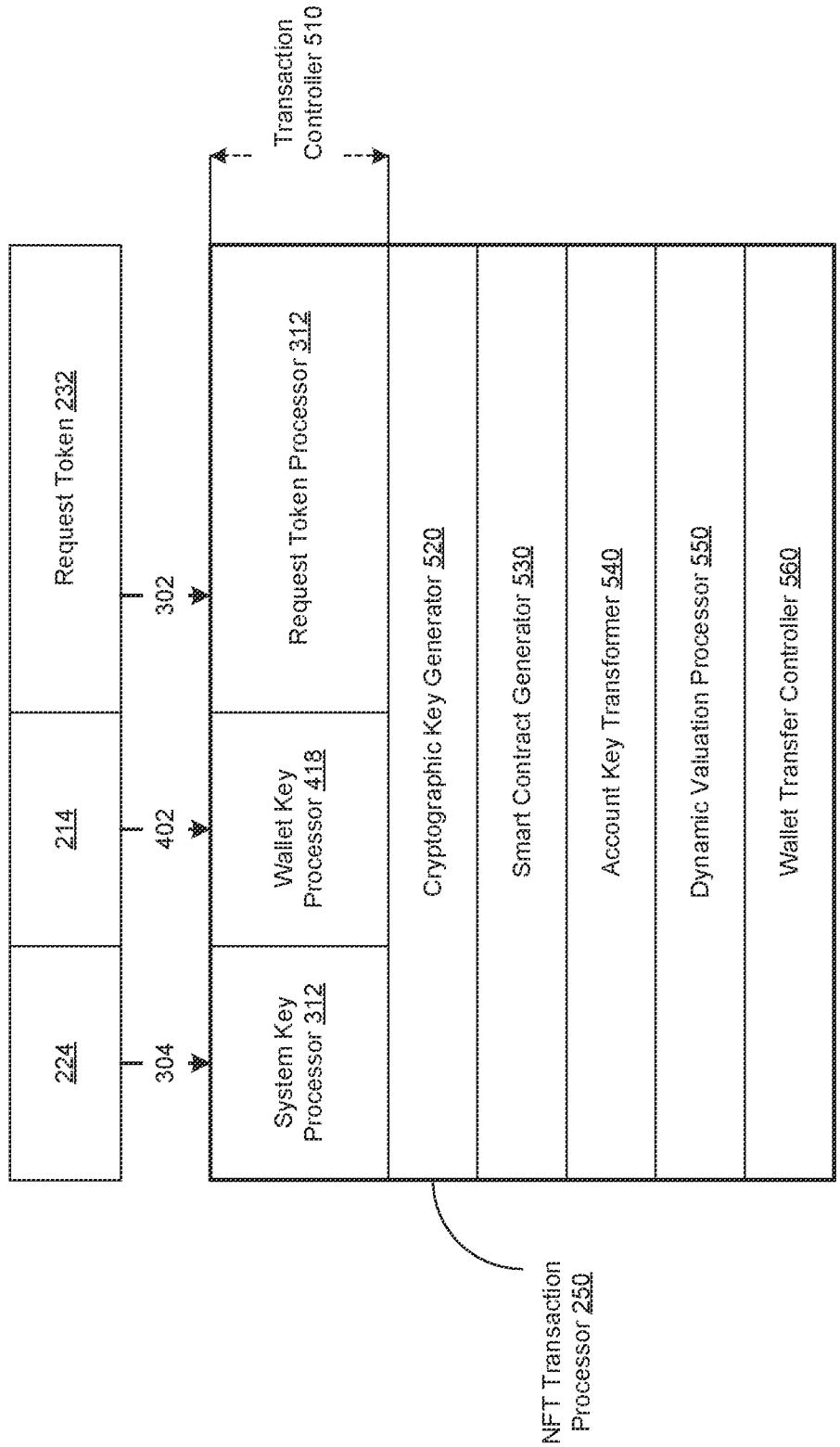
FIG. 5 depicts an example transaction processor, in accordance with present implementations.

FIG. 5 depicts an example transaction processor, in accordance with present implementations. As illustrated by way of example in FIG. 5, an example transaction processor 500 can include at least a transaction controller 510, a cryptographic key generator 520, a smart contract generator 530, an account key transformer 540, a dynamic valuation processor 550, and a wallet transfer controller 560. The transaction controller 510 can detect presence of a token, and can transmit the token to a token processor compatible with that particular token. The transaction controller 510 can include the request token processor 312, the system key processor 312, and the wallet key processor 418.

The cryptographic key generator 520 can generate and modify cryptographic keys in communication with the cryptographic key processor 120. For example, the cryptographic key generator 520 can include one or more asymmetric or symmetric key generators, and can generate public-private key pairs. For example, a public-private key pair can include a public key configured to encrypt in accordance with a particular transform process. For example, a public-private key pair can include a private key configured to decrypt in accordance with a particular transform process compatible with the public key. The cryptographic key generator 520 can link the public-private key pair with any individual object or component. The cryptographic key processor 120 can link any public key or private key corresponding to the public-private key pair with any individual object or component. For example, the cryptographic key generator 520 can generate a key compatible with or linked with a particular identifier corresponding to a particular, device, user, customer, account, system, or any combination thereof.

The smart contract generator 530 can generate and modify one or more smart contracts in communication with the smart contract engine 150. The smart contract generator 530 can execute instructions to generate or modify a cryptographic container, to add or remove objects from a cryptographic container, and to execute various processors linked with or embedded with a smart contract. The smart contract generator 530 can generate a smart contract based on criteria of a transfer of an NFT or modification to one or more accounts linked with corresponding cryptographic keys. For example, the smart contract generator 530 can generate the NFT smart contract 220 to include one or more of the gated NFTs 220, in response to determining that a request to transfer an NFT from the wallet container 310 is valid in accordance with the NFT validation processor 412.

The account key transformer 540 can generate and modify one or more cryptographic keys associated with particular accounts or devices in communication with the smart contract engine 150. For example, the account key transformer 540 can identify a public-private key pair corresponding to a wallet container of a buyer of an NFT. The account key transformer 540 can modify one or more keys of the public-private key pair to link with a different account of the account system 104, an additional account of the account system 104, a substitute account of the account system 104, or any combination thereof.

The dynamic valuation processor 550 can receive, generate and modify a quantitative value of an NFT. The dynamic valuation processor 550 can receive a quantitative value of an NFT that corresponds to an amount of fiat currency or MBC currency, for example. The dynamic valuation processor 550 can periodically update or received an updated quantitative value in accordance with a predetermined schedule, a triggering event, or any combination thereof. The dynamic valuation processor 550 can modify an allocation of an NFT in response to a determination that a quantitative value of the NFT has changed. For example, the dynamic valuation processor 550 can determine that a value of an NFT has increased by 10% to $1,100, and can increase an allocation of the NFT to a cryptographic key pair corresponding to a financial institution that corresponds to an increased allocation of $100 to the cryptographic key pair corresponding to a financial institution. For example, the dynamic valuation processor 550 can determine that a value of an NFT has increased by 10% to $1,100, and can increase an allocation of the NFT to a cryptographic key pair corresponding to a buyer of the NFT that corresponds to an increased allocation of $100 to the cryptographic key pair corresponding to the buyer of the NFT. The dynamic valuation processor 550 can obtain, from a template of the smart contract corresponding to the NFT, one or more rules or instructions controlling modification of allocation of an NFT in response to a change in valuation of the NFT. Thus, the dynamic valuation processor 550 can provide a technical improvement of automatically and dynamically modifying allocations of an NFT to multiple cryptographic keys based on criteria of particular smart contracts correspond to the NFT.

The wallet transfer controller 560 can instruct a wallet container to execute a transfer of contents of the wallet container or the wallet container 210 to a wallet container linked with the wallet account key pair 336, in response to detecting or receiving an indication of a wallet transfer event. The wallet transfer controller 560 can validate, by one or more of the system key processor 312 and the wallet key processor 418, that the wallet container can be transferred. For example, the wallet transfer controller 560 can validate whether the wallet container is located at the data processing system by detecting presence of the system cryptographic key 224. In response to detecting the presence of the system cryptographic key 224, the wallet transfer controller 560 can instruct a wallet container to execute a transfer of contents of the wallet container or the wallet container 210. In response to failing to detect the presence of the system cryptographic key 224, the wallet transfer controller 560 can instruct a wallet container to block transfer of contents of the wallet container or the wallet container 210. In response to detecting an absence of the system cryptographic key 224, the wallet transfer controller 560 can instruct a wallet container to block transfer of contents of the wallet container or the wallet container 210.

Figure 6:
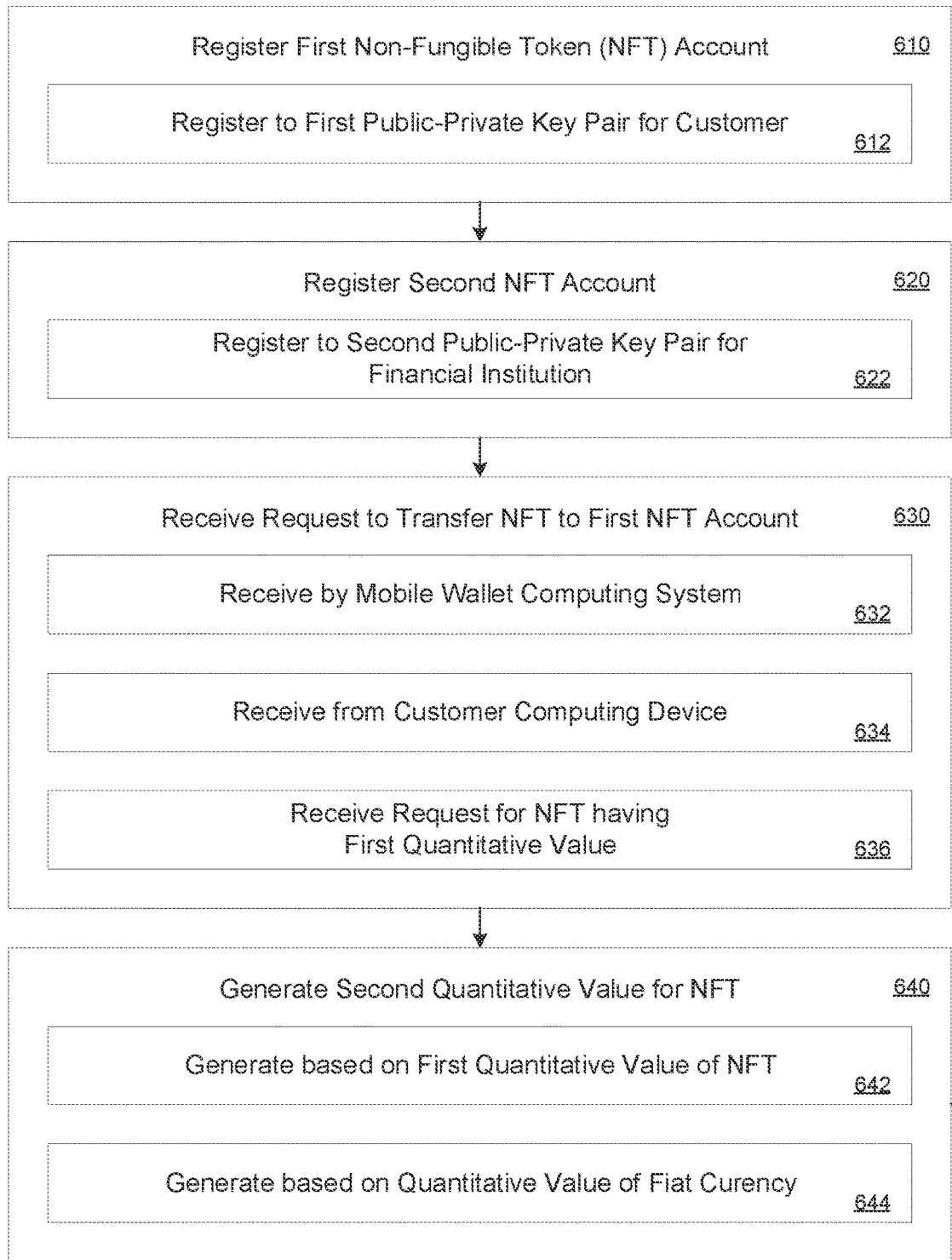
FIG. 6 depicts an example prepare an NFT for transfer, in accordance with present implementations.

FIG. 6 depicts an example prepare an NFT for transfer, in accordance with present implementations. At least one of the system 100 and the device 200 can perform method 600. At 610, the method 600 can register an NFT account. At 612, the method 600 can register an NFT account to a first public-private key pair for a customer. At 620, the method 600 can register a second NFT account. At 622, the method 600 can register a second NFT account to a second public-private key pair for a financial institution. At 630, the method 600 can receive a request to transfer an NFT to a first NFT account. At 632, the method 600 can receive a request to transfer an NFT to a first NFT account by a mobile wallet computing system. At 634, the method 600 can receive a request to transfer an NFT to a first NFT account from a customer computing device. At 636, the method 600 can receive a request to transfer an NFT to a first NFT account for an NFT having a first quantitative value.

At 640, the method 600 can generate a second quantitative value for an NFT. For example, the method can include generating, by the NFT transaction processor, the second quantitative value of the first NFT based on a difference between the quantitative value of the first NFT and the quantitative value of fiat currency. At 642, the method 600 can generate a second quantitative value for an NFT based on a first quantitative value of an NFT. At 644, the method 600 can generate a second quantitative value for an NFT based on a quantitative value of fiat currency.

Figure 7:
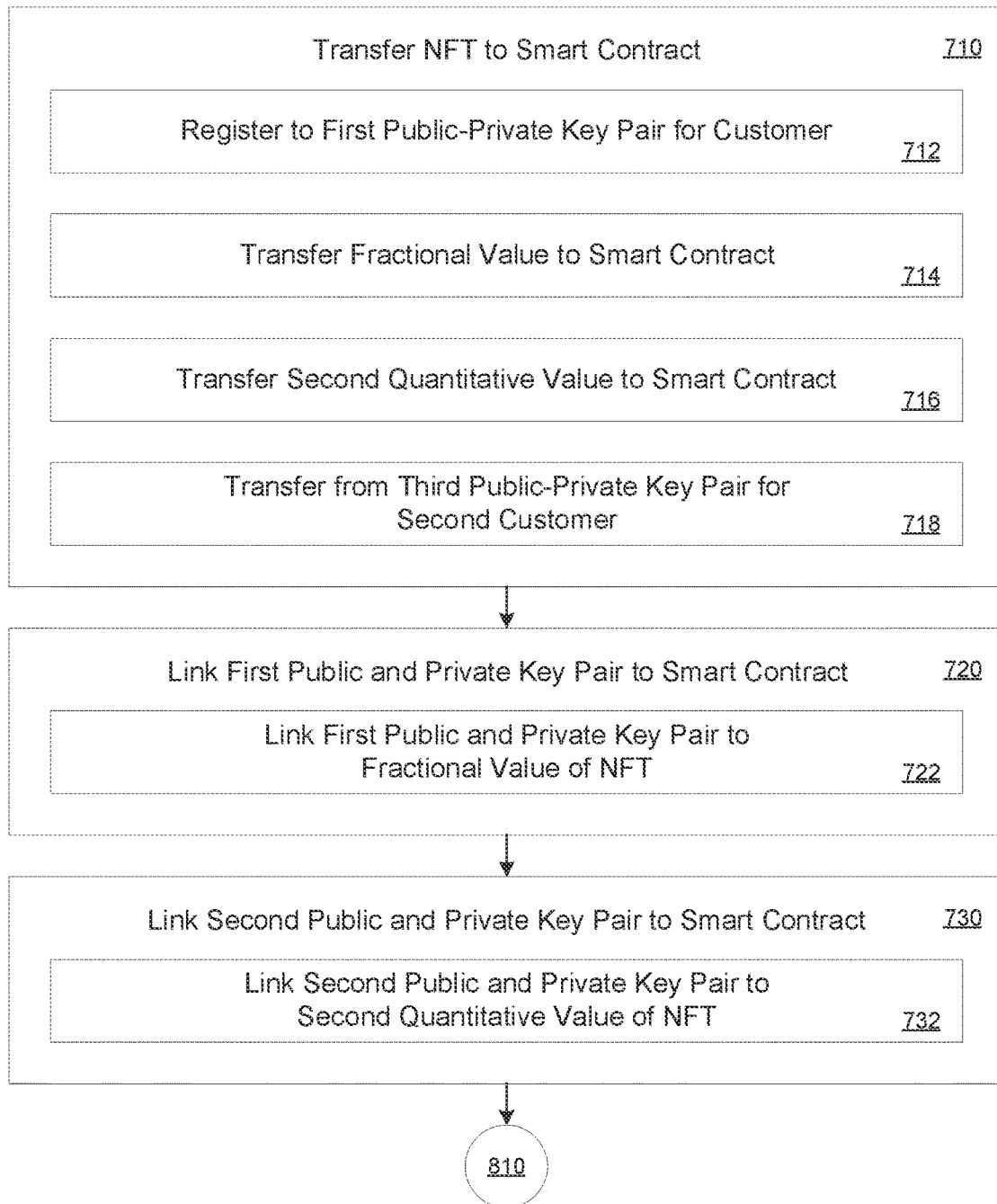
FIG. 7 depicts an example transfer an NFT, in accordance with present implementations.

FIG. 7 depicts an example transfer an NFT, in accordance with present implementations. At least one of the system 100 and the device 200 can perform method 700.

At 710, the method 700 can transfer an NFT to a smart contract. For example, the method can include transferring, by the NFT transaction processor in response to one or more transfers of fiat currency from a fiat currency account registered to the first public and private key pair, the first public and private key pair from the smart contract to the first NFT. The method can include unlinking, by the NFT transaction processor, the second public and private key pair from the smart contract and the second quantitative value of the first NFT. At 712, the method 700 can register to a first public-private key pair for a customer. For example, the method can include transferring, by the NFT transaction processor to the smart contract, the first public and private key pair to the smart contract from the NFT. At 714, the method 700 can transfer a fractional value to a smart contract. For example, the method can include transferring, by the NFT transaction processor to the smart contract, one or more of the fractional value of the NFT and the second quantitative value of the NFT. At 716, the method 700 can transfer a second quantitative value to a smart contract. For example, a value of one or more transfers of fiat currency that satisfy a threshold corresponding to the second quantitative value of the NFT. At 718, the method 700 can transfer an NFT to a smart contract from a third public-private key pair for a second customer. For example, the method can include transferring, by the NFT transaction processor to the smart contract, the NFT from a third public and private key pair registered to a third NFT account of a second customer.

At 720, the method 700 can link a first public and private key pair to a smart contract. At 722, the method 700 can link a first public and private key pair to a fractional value of an NFT. At 730, the method 700 can link a second public and private key pair to a smart contract. At 732, the method 700 can link a second public and private key pair to a second quantitative value of an NFT.

Figure 8:
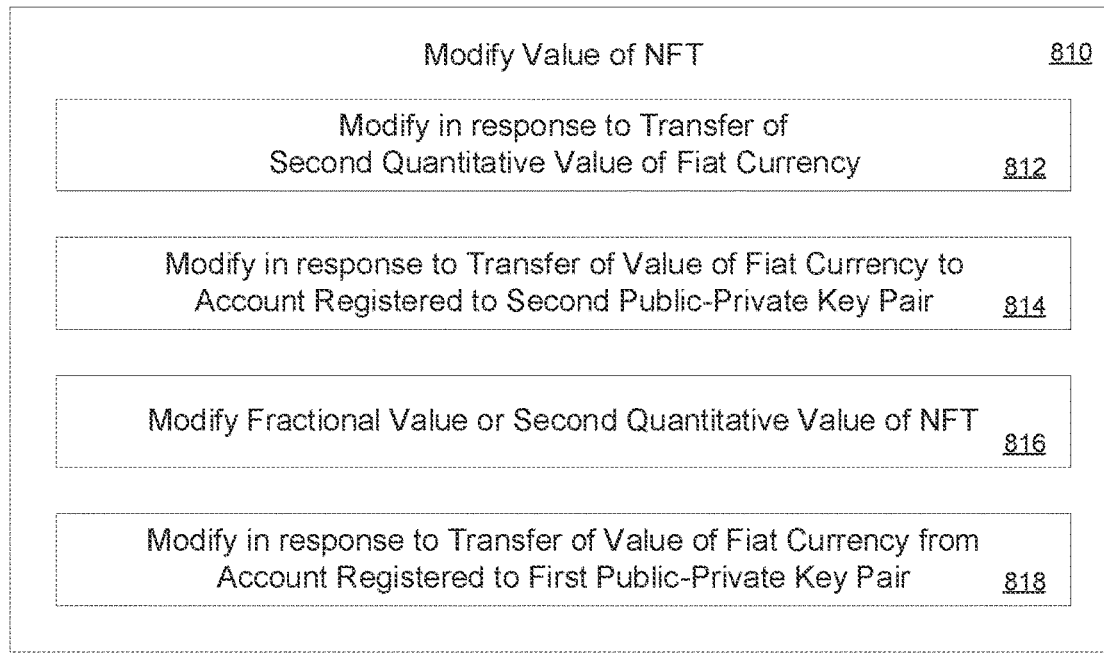
FIG. 8 depicts an example modify an aspect of an NFT, in accordance with present implementations.

FIG. 8 depicts an example modify an aspect of an NFT, in accordance with present implementations. At least one of the system 100 and the device 200 can perform method 800. At 810, the method 800 can modify a value of an NFT. At 812, the method 800 can modify a value of an NFT in response to a transfer of a second quantitative value of fiat currency. At 814, the method 800 can modify a value of an NFT in response to a transfer of a value of fiat currency to an account registered to a second public-private key pair. At

816, the method 800 can modify a fractional value or a second quantitative value of an NFT. For example, the method can include modifying, by the smart contract and in response to a transfer of a second quantitative value of fiat currency to a first fiat currency account registered to the second public and private key pair, one or more of the fractional value of the NFT and the second quantitative value of the NFT. For example, the method can include modifying, by the smart contract and in response to a transfer of a second quantitative value of fiat currency from a second fiat currency account registered to the first public and private key pair, one or more of the fractional value of the NFT and the second quantitative value of the NFT. At 818, the method 800 can modify a value of an NFT in response to a transfer of value of fiat currency from an account registered to a first public-private key pair.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method to collateralize a non-fungible token (NFT) in a transaction, the method comprising:
registering, by an account processor, a first NFT account of a customer to a first public and private key pair;
registering, by the account processor, a second NFT account of a financial institution to a second public and private key pair;

receiving, by a mobile wallet computing system from a customer computing device, a request to transfer to the first NFT account an NFT having a quantitative value;

periodically updating, by a dynamic valuation processor, the quantitative value of the NFT in accordance with a predetermined schedule;

generating, by an NFT transaction processor, a second quantitative value of the NFT based on the quantitative value of the NFT and a quantitative value of fiat currency;

transferring, by the NFT transaction processor to a smart contract, the NFT;

linking, by the NFT transaction processor, the first public and private key pair to the smart contract and a fractional value of the NFT; and linking, by the NFT transaction processor, the second public and private key pair to the smart contract and the second quantitative value of the NFT.

2. The method of claim 1, further comprising:
transferring, by the NFT transaction processor to the smart contract, one or more of the fractional value of the NFT and the second quantitative value of the NFT.

3. The method of claim 1, further comprising:
transferring, by the NFT transaction processor to the smart contract, the first public and private key pair to the smart contract from the NFT.

4. The method of claim 1, further comprising:
transferring, by the NFT transaction processor to the smart contract, the NFT from a third public and private key pair registered to a third NFT account of a second customer.

5. The method of claim 1, further comprising:
modifying, by the smart contract and in response to a transfer of a second quantitative value of fiat currency to a first fiat currency account registered to the second public and private key pair, one or more of the fractional value of the NFT and the second quantitative value of the NFT.

6. The method of claim 1, further comprising:
modifying, by the smart contract and in response to a transfer of a second quantitative value of fiat currency from a second fiat currency account registered to the first public and private key pair, one or more of the fractional value of the NFT and the second quantitative value of the NFT.

7. The method of claim 1, further comprising:
transferring, by the NFT transaction processor in response to one or more transfers of fiat currency from a fiat currency account registered to the first public and private key pair, the first public and private key pair from the smart contract to the first NFT; and unlinking, by the NFT transaction processor, the second public and private key pair from the smart contract and the second quantitative value of the first NFT.

8. The method of claim 7, a value of the transfers of fiat currency satisfying a threshold corresponding to the second quantitative value of the NFT.

9. The method of claim 1, further comprising:
generating, by the NFT transaction processor, the second quantitative value of the first NFT based on a difference between the quantitative value of the first NFT and the quantitative value of fiat currency.

10. A system to collateralize a non-fungible token (NFT) in a transaction, the system comprising:
memory and one or more processors to:
register, by an account processor, a first NFT account of a customer to a first public and private key pair;

register, by the account processor, a second NFT account of a financial institution to a second public and private key pair;

receive, by a mobile wallet computing system from a customer computing device, a request to transfer to the first NFT account an NFT having a quantitative value;

periodically update, by a dynamic valuation processor, the quantitative value of the NFT in accordance with a predetermined schedule;

generate, by an NFT transaction processor, a second quantitative value of the NFT based on the quantitative value of the NFT and a quantitative value of fiat currency;

transfer, by the NFT transaction processor to a smart contract, the NFT;

link, by the NFT transaction processor, the first public and private key pair to the smart contract and the fractional value of the NFT; and link, by the NFT transaction processor, the second public and private key pair to the smart contract and the second quantitative value of the NFT.

11. The system of claim 10, the processors to:
transfer, by the NFT transaction processor to the smart contract, one or more of the fractional value of the NFT and the second quantitative value of the NFT.

12. The system of claim 10, the processors to:
transfer, by the NFT transaction processor to the smart contract, the first public and private key pair to the smart contract from the NFT.

13. The system of claim 10, the processors to:
transfer, by the NFT transaction processor to the smart contract, the NFT from a third public and private key pair registered to a third NFT account of a second customer.

14. The system of claim 10, the processors to:
modify, by the smart contract and in response to a transfer of a second quantitative value of fiat currency to a first fiat currency account registered to the second public and private key pair, one or more of the fractional value of the NFT and the second quantitative value of the NFT.

15. The system of claim 10, the processors to:
modify, by the smart contract and in response to a transfer of a second quantitative value of fiat currency from a second fiat currency account registered to the first public and private key pair, one or more of the fractional value of the NFT and the second quantitative value of the NFT.

16. The system of claim 10, the processors to:
transfer, by the NFT transaction processor in response to one or more transfers of fiat currency from a fiat currency account registered to the first public and private key pair, the first public and private key pair from the smart contract to the first NFT; and unlink, by the NFT transaction processor, the second public and private key pair from the smart contract and the second quantitative value of the first NFT.

17. The system of claim 16, a value of the transfers of fiat currency satisfying a threshold corresponding to the second quantitative value of the NFT.

18. The system of claim 10, the processors to:
generate, by the NFT transaction processor, the second quantitative value of the first NFT based on a difference between the quantitative value of the first NFT and the quantitative value of fiat currency.

19. A non-transitory computer readable medium including one or more instructions stored thereon and executable by a processor to:
  register, by a processor, a second non-fungible token (NFT) account of a financial institution to a second public and private key pair;
  receive, by the processor via a mobile wallet computing system from a customer computing device, a request to transfer to a first NFT account an NFT having a quantitative value;
  periodically update, by the processor, the quantitative value of the NFT in accordance with a predetermined schedule;
  generate, by the processor, a second quantitative value of the NFT based on the quantitative value of the NFT and a quantitative value of fiat currency;
  transfer, by the processor to a smart contract, the NFT;
  link, by the processor, the first public and private key pair to the smart contract and the fractional value of the NFT; and
  link, by the processor, the second public and private key pair to the smart contract and the second quantitative value of the NFT.

20. The non-transitory computer readable medium of claim 19, wherein the computer readable medium further includes one or more instructions executable by the processor to:
  modify, by the smart contract and in response to a transfer of a second quantitative value of fiat currency to a first fiat currency account registered to the second public and private key pair, the second quantitative value of the NFT; and
  modify, by the smart contract and in response to the transfer of the second quantitative value of fiat currency from a second fiat currency account registered to the first public and private key pair, the fractional value of the NFT.

* * * * *